United States Patent
Chen et al.

(10) Patent No.: US 11,574,053 B1
(45) Date of Patent: Feb. 7, 2023

(54) SYSTEM AND METHOD FOR DETECTING MALICIOUS SCRIPTS

(71) Applicant: Trend Micro Incorporated, Tokyo (JP)

(72) Inventors: Te-Ching Chen, Taipei (TW);
Chih-Kun Ho, Taipei (TW);
Yung-Hsiang Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 796 days.

(21) Appl. No.: 16/239,942

(22) Filed: Jan. 4, 2019

(51) Int. Cl.
| | |
|---|---|
| *G06F 21/56* | (2013.01) |
| *G06F 21/55* | (2013.01) |
| *G06N 20/00* | (2019.01) |
| *G06F 9/54* | (2006.01) |
| *G06N 5/00* | (2006.01) |
| *G06F 40/211* | (2020.01) |
| *G06F 40/284* | (2020.01) |

(52) U.S. Cl.
CPC ............ *G06F 21/564* (2013.01); *G06F 9/544* (2013.01); *G06F 21/554* (2013.01); *G06F 21/563* (2013.01); *G06F 21/566* (2013.01); *G06F 40/211* (2020.01); *G06F 40/284* (2020.01); *G06N 5/003* (2013.01); *G06N 20/00* (2019.01)

(58) Field of Classification Search
CPC .... G06F 21/554; G06F 21/563; G06F 21/564; G06F 21/566; G06F 40/211; G06F 40/284; G06F 9/544; G06N 20/00; G06N 5/003; H04L 63/1416; H04L 63/145
See application file for complete search history.

(56) References Cited

U.S. PATENT DOCUMENTS

| | | | |
|---|---|---|---|
| 5,951,698 A * | 9/1999 | Chen .................... | G06F 21/563 714/38.1 |
| 6,314,562 B1 | 11/2001 | Biggerstaff | |
| 8,838,992 B1 * | 9/2014 | Zhu ....................... | G06F 21/563 713/186 |
| 10,581,888 B1 * | 3/2020 | Agranonik .......... | H04L 63/1466 |

(Continued)

OTHER PUBLICATIONS

Help deobfuscating Malicious Word DOC Macro: Malware, 3 sheets [retrieved on Nov. 2, 2016], retrieved from the internet: https://www.reddit.com/r/Malware/comments/3qkw3w/help_deobfuscating_malicious_word_doc_macro/.

(Continued)

*Primary Examiner* — Jeremy S Duffield
(74) *Attorney, Agent, or Firm* — Beyer Law Group LLP

(57) ABSTRACT

An endpoint system receives a target file for evaluation for malicious scripts. The original content of the target file is normalized and stored in a normalized buffer. Tokens in the normalized buffer are translated to symbols, which are stored in a tokenized buffer. Strings in the normalized buffer are stored in a string buffer. Tokens that are indicative of syntactical structure of the normalized content are extracted from the normalized buffer and stored in a structure buffer. The content of the tokenized buffer and counts of tokens represented as symbols in the tokenized buffer are compared against heuristic rules indicative of malicious scripts. The contents of the tokenized buffer and string buffer are compared against signatures of malicious scripts. The contents of the tokenized buffer, string buffer, and structure buffer are input to a machine learning model that has been trained to detect malicious scripts.

13 Claims, 9 Drawing Sheets

(56) References Cited

U.S. PATENT DOCUMENTS

| | | | |
|---|---|---|---|
| 2005/0172338 A1* | 8/2005 | Sandu | G06F 21/562 726/22 |
| 2011/0197177 A1* | 8/2011 | Mony | G06F 8/51 717/115 |
| 2012/0216280 A1 | 8/2012 | Zorn et al. | |
| 2014/0189661 A1 | 7/2014 | Wuethinger et al. | |
| 2014/0283033 A1* | 9/2014 | Anand | H04L 63/1441 726/22 |
| 2015/0178007 A1* | 6/2015 | Moisa | G06F 16/25 713/190 |
| 2015/0379426 A1 | 12/2015 | Steele et al. | |
| 2016/0072827 A1* | 3/2016 | Speer | H04L 63/145 726/23 |
| 2016/0094572 A1* | 3/2016 | Tyagi | G06F 8/427 726/23 |

OTHER PUBLICATIONS

Analyze of a malicious Word document with an embedded payload—SANS Internet Storage, 5 sheets [retrieved on Nov. 2, 2016], retrieved from the internet: https://isc.sans.edu/forums/diary/Analyze+of+a+malicious+Word+document+with+an+embedded+payload/20377/.

Deobfuscating Malicious VBA Macro with a Few Lines of Python, May 8, 2015, 13 sheets [retrieved on Nov. 2, 2016], retrieved from the internet: https://blog.rootshell.be/2015/05/08/deobfuscating-malicious-vba-macro-with-a-few-lines-of-python/.

Malware Musings—Thoughts on malware and malware analysis, 19 sheets [retrieved on Nov. 2, 2016], retrieved from the internet: https://malwaremusings.com/2016/02/21/an-exercise-in-deobfuscating-ms-word-macros-using-linux/.

Sudeep Singh "Breaking the Sandbox", pp. 1-40 [retrieved on Nov. 2, 2016], retrieved from the internet: https://www.exploit-db.com/docs/34591.pdf.

Joe Security's Blog—Dynamically Analyze Offices Macros by instrumenting VBE, Published Apr. 5, 2015, 4 sheets, retrieved from the internet: http://joe4security.blogspot.com.au/2015/05/dynamically-analyze-offices-marcos-by.html.

Solution Brief—Safeguarding against Macro Malware, 4 sheets [retrieved on Nov. 2, 2016], retrieved from the internet: http://www.mcafee.com/au/resources/solution-briefs/sb-quarterly-threats-nov-2015-3.pdf.

Sophos—Why Word malware is BASIC: SophosLabs takes apart a booby-trapped document, 10 sheets [retrieved on Nov. 2, 2016] retrieved from the internet: https://blogs.sophos.com/2015/09/28/why-word-malware-is-basic/.

Lesson 13: Inline Functions in C++, 1 sheet [retrieved on Nov. 2, 2016], retrieved from the internet: http://www.cprogramming.com/tutorial/lesson13.html.

Inline funtion—From Wikipedia, the free encyclopedia, 5 sheets [retrieved on Jan. 27, 2017], retrieved from the internet: https://en.wikipedia.org/wiki/Inline_function.

GitHub—trendmicro/tlsh, 6 sheets [retrieved on Nov. 2, 2016], retrieved from the internet: https://github.com/trendmicro/tlsh.

Abstract syntax tree—From Wikipedia, the free encyclopedia, 5 sheets [retrieved on Nov. 2, 2016], retrieved from the internet: https://en.wikipedia.org/wiki/Abstract_syntax_tree.

Constant folding—From Wikipedia, the free encyclopedia, 4 sheets [retrieved on Nov. 2, 2016], retrieved from the internet: https://en.wikipedia.org/wiki/Constant_folding.

Loop unrolling—From Wikipedia, the free encyclopedia, 8 sheets [retrieved on Nov. 2, 2016], retrieved from the internet: https://en.wikipedia.org/wiki/Loop_unrolling.

Dead code elimination—From Wikipedia, the free encyclopedia, 4 sheets [retrieved on Nov. 2, 2016], retrieved from the internet: https://en.wikipedia.org/wiki/Dead_code_elimination.

Nearest neighbour algorithm—From Wikipedia, the free encyclopedia, 2 sheets [retrieved on Nov. 2, 2016], retrieved from the internet: https://en.wikipedia.org/wiki/Nearest_neighbour_algorithm.

Tokenization, 2008 Cambridge University Press, 3 sheets, [retrieved on Feb. 2, 2019], retrieved from the internet: https://nlp.standford.edu/IR-book/htmledition/tokenization-1.thml.

* cited by examiner

FIG. 4A

ORIGINAL CONTENT BUFFER ⟋335

/* Test for eval() */
var expr = new String("2+2");
eval(expr);

FIG. 4B

NORMALIZED BUFFER ⟋336 var expr = new String("2+2"); eval(expr);

FIG. 4C

TOKENIZED BUFFER ⟋337

STRING BUFFER ⟋338 expr2+2expr

FIG. 4E

STRUCT BUFFER ⟋339 var=newString();eval();

ORIGINAL CONTENT BUFFER /‑335

```
WshShell = WScript.CreateObject("WScript.Shell");
WshShell.Run("cmd.exe",9);
WScript.Sleep(1234);
/******************/
/* Test for eval() */
var expr1 = new String("HTTP://EDICEP.ES/ERT/SS.EXE");
expr2 =            "EDICEP.ES/ERT/SS.EXE";
expr = expr1 +     expr2
eval(expr);
```

FIG. 6A

NORMALIZED BUFFER /‑336

```
WshShell = WScript.CreateObject("WScript.Shell");
WshShell.Run("cmd.exe",9);
WScript.Sleep(1234);
var expr1 = new String("HTTP://");
expr2 = "EDICEP.ES/ERT/SS.EXE";
expr = expr1 + expr2;
eval(expr);
```

FIG. 6B

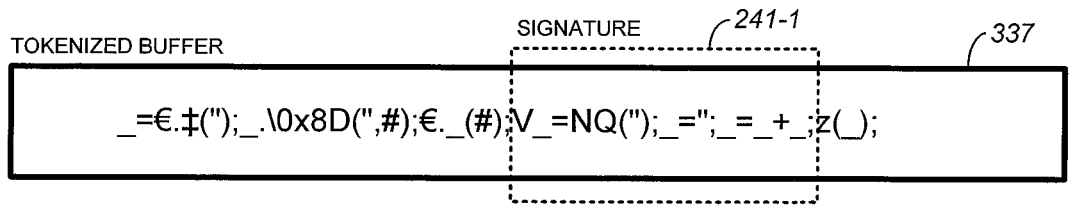
FIG. 6C
TOKENIZED COUNT ARRAY    340
| Token | Count | Token | Count |
|---|---|---|---|
| #String | 4 | New | 1 |
| #Number | 2 | String | 1 |
| ( | 5 | var | 1 |
| ) | 5 | _ | 9 |
| + | 1 | Eval | 1 |
| , | 1 | Wscript | 2 |
| . | 3 | CreateObject | 1 |
| ; | 7 | Run | 1 |
| = | 4 | | |
FIG. 6D
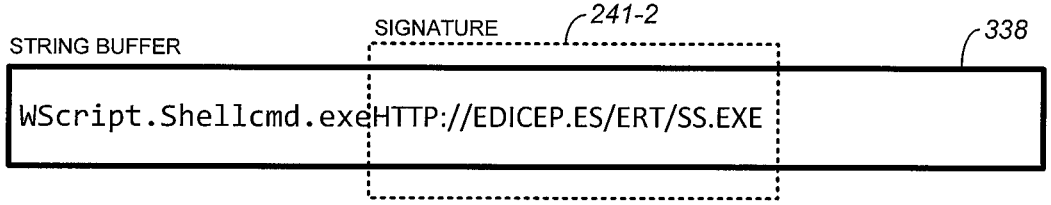
FIG. 6E

STRUCT BUFFER
                                                                    ⎯339

```
WshShell = WScript.CreateObject('');
WshShell.Run('',9);
WScript.Sleep(1234);
var expr1 = new String('');
expr2 = '';
expr = expr1 + expr2;
eval(expr);
```

FIG. 6F

SYSTEM AND METHOD FOR DETECTING MALICIOUS SCRIPTS

BACKGROUND OF THE INVENTION

1. Field of the Invention

The present invention relates generally to computer security, and more particularly but not exclusively to detection of malicious scripts.

2. Description of the Background Art

Scripts are written in source code, i.e. human-readable code, that is typically interpreted rather than compiled to binary code prior to execution. Examples of scripts include programs written in the JavaScript scripting language, Visual Basic scripting language, and macros employed in application programs. Because scripts are typically executed without being compiled, scripts are easily distributed to user computers for execution by web browsers, word processing programs, and other application programs. Unfortunately, their ease of distribution and use also make scripts vulnerable to being employed for malicious purposes. More particularly, malicious scripts, i.e., scripts that have malicious code, may be received in user computers by email, drive-by download, website navigation, and other distribution methods.

Although scripts are in source code form, which should make the script relatively easy to read, the source code may be obfuscated to hide its true intentions and evade analysis. Evaluation of scripts to detect malicious code may also consume significant computing resources, making the evaluation take a long time or unsuitable for some computing devices.

SUMMARY

In one embodiment, an endpoint system receives a target file for evaluation for malicious scripts. The original content of the target file is normalized and stored in a normalized buffer. Tokens in the normalized buffer are translated to symbols, which are stored in a tokenized buffer. Strings in the normalized buffer are stored in a string buffer. Tokens that are indicative of the syntactical structure of the normalized content (and thus the script) are extracted from the normalized buffer and stored in a structure buffer. The content of the tokenized buffer and counts of tokens represented as symbols in the tokenized buffer are compared against heuristic rules indicative of malicious scripts. The contents of the tokenized buffer and string buffer are compared against signatures of malicious scripts. The contents of the tokenized buffer, string buffer, and structure buffer are input to a machine learning model that has been trained to detect malicious scripts. A response action may be performed when the target file is detected to comprise a malicious script. The response action may include putting the target file in quarantine, alerting an administrator, and/or other actions that would prevent execution of the malicious script.

These and other features of the present invention will be readily apparent to persons of ordinary skill in the art upon reading the entirety of this disclosure, which includes the accompanying drawings and claims.

DESCRIPTION OF THE DRAWINGS

FIGS. 4A-4E show example buffer contents in accordance with an embodiment of the present invention.

FIGS. 6A-6F show another example buffer contents in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
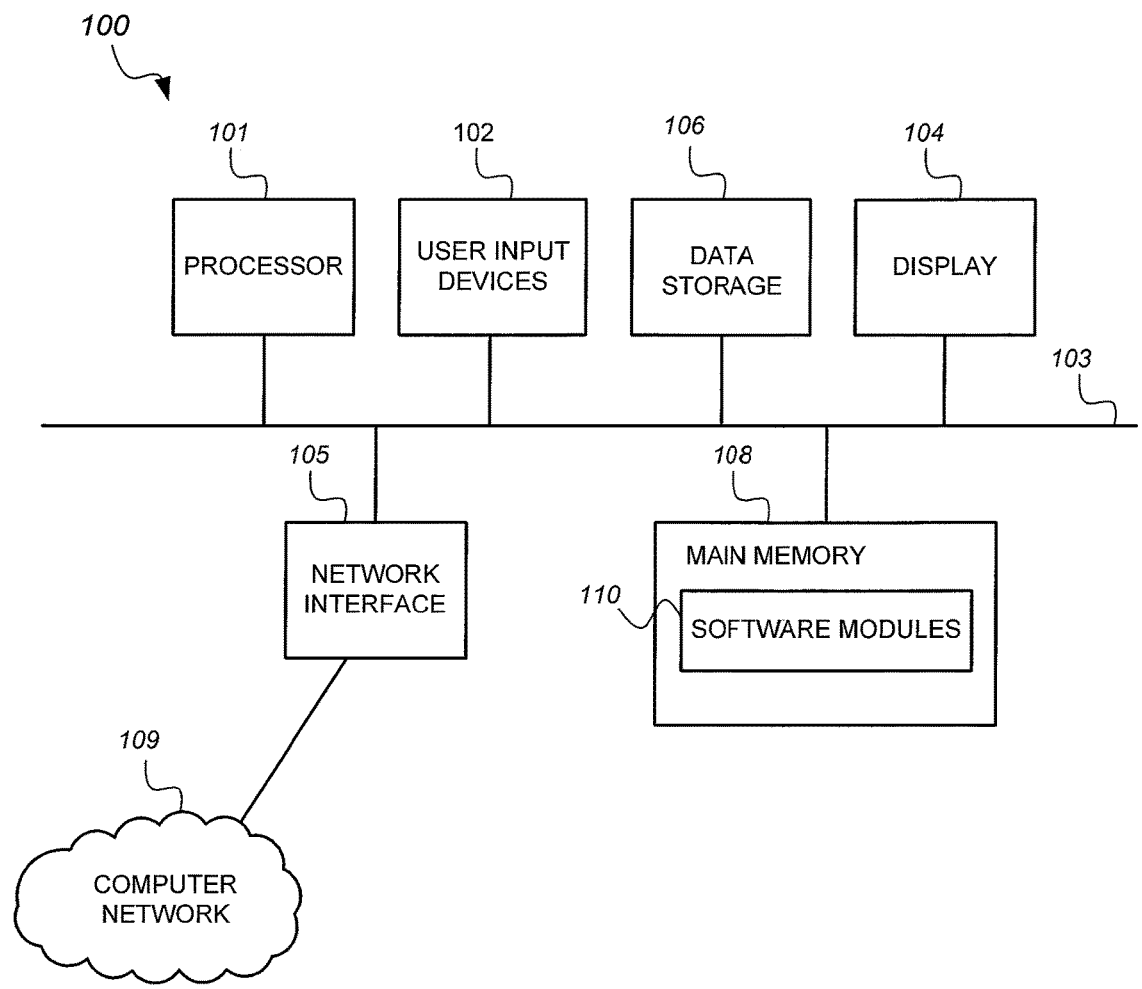
FIG. 1 shows a logical diagram of a computer system that may be employed with embodiments of the present invention.

Referring now to FIG. 1, there is shown a logical diagram of a computer system 100 that may be employed with embodiments of the present invention. The computer system 100 may be employed as an endpoint system, a backend system, or other computer system described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

In an embodiment where the computer system 100 is employed as an endpoint system (see FIG. 2, 230), the software modules 110 may comprise components of a malicious script detector. In an embodiment where the computer system 100 is employed as a backend system (see FIG. 2, 240), the software modules 110 may comprise malicious script signatures, heuristic rules for detecting malicious scripts, and a machine learning model for detecting malicious scripts.

As can be appreciated, the functionalities of the software modules 110 may also be implemented in hardware (e.g., application-specific integrated circuit, field-programmable gate array, programmable logic device) or a combination of hardware and software depending on the needs of a particular computer security application. Embodiments of the present invention are inextricably tied to computer technology, and improve the state-of-the-art in computer security by providing an efficient mechanism for determining whether or not a text file comprises malicious script.

Figure 2:
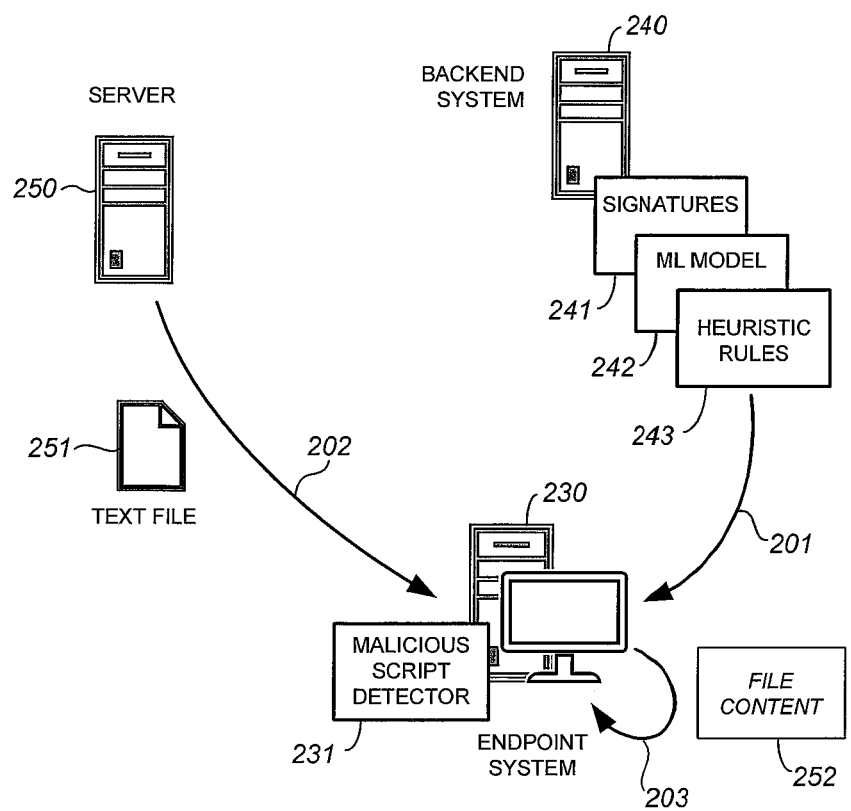
FIG. 2 shows a logical diagram of a malicious script detection system in accordance with an embodiment of the present invention.

FIG. 2 shows a logical diagram of a malicious script detection system in accordance with an embodiment of the present invention. In the example of FIG. 2, the malicious script detection system comprises an endpoint system 230 and a backend system 240. The endpoint system 230, the backend system 240, and other components of the malicious script detection system may communicate over a computer network.

The endpoint system 230 comprises a computer and corresponding software modules for receiving a text file 251 and determining whether or not the text file 251 comprises a malicious script. In the example of FIG. 2, the software modules of the endpoint system 230 includes a malicious script detector 231. The endpoint system 230 is so-named because it is the computer where malicious scripts are detected. The endpoint system 230 may be a user computer, or a central computer that performs malicious script detection for a plurality of user computers.

The backend system 240 comprises a computer and corresponding software modules for generating signatures 241 of malicious scripts, machine learning model 242 that have been trained to detect malicious scripts, and heuristic rules 243 for detecting malicious scripts. The backend system 240 may provide the signatures 241, machine learning model 242, and heuristic rules 243 to the endpoint system 230 (see arrow 201) over the Internet or from within the enterprise computer network that includes the endpoint system 230. The backend system 240 may be maintained and operated by an antivirus research laboratory, such as those by vendors of computer security products. As can be appreciated, the generation of the signatures 241, machine learning model 242, and heuristic rules 243 may also be performed by the endpoint system 230.

The endpoint system 230 may receive the text file 251 from a server 250 (see arrow 202) over a computer network. The text file 251 is a target file, i.e., a text file being evaluated for malicious scripts. As an example, the server 250 may be a web server, in which case the text file 250 may be received over the Internet in conjunction with receiving a webpage. As another example, the server 250 may be an email server, in which case the text file 251 may be received as an email attachment.

The malicious script detector 231 is configured to determine whether or not the text file 251 comprises a malicious script. More particularly, the malicious script detector 231 may be configured to load the original content of the text file 251 in an original content buffer and process the original content of the text file 251 (see arrow 203) to determine if the text file 251 comprises a script and, if so, determine whether or not the script is malicious.

To determine whether or not the script is malicious, the malicious script detector 231 may be configured to remove extraneous characters from the original content of the text file 251 to generate normalized content, translate tokens of the normalized content into symbols to generate tokenized content, extract tokens that represent the syntactical structure of the normalized content to generate structure content, and extract strings from the normalized content to generate string content. The malicious code detector 231 may be configured to store the original content, the normalized content, the tokenized content, the structure content, and the string content in separate buffers in memory. The malicious code detector 231 may also be configured to generate a token count array, which comprises counts of tokens that are represented as symbols in the tokenized content.

The malicious code detector 231 may be configured to compare the tokenized content and the counts of tokens against the heuristic rules 243, compare the tokenized content and the string content against the signatures 241, and input the tokenized content, the string content, and the structure content to the machine learning model 243. The result of the aforementioned comparisons and use of the machine learning model 243 indicate whether or the text file 251 comprises a malicious script. In response to detecting that the text file 251 comprises malicious script, the malicious script detector 231 may be configured to perform a response action against the malicious script, including putting the text file 251 in quarantine, deleting the text file 251, alerting an administrator, and/or performing other response action to block execution of the malicious script.

Figure 3:
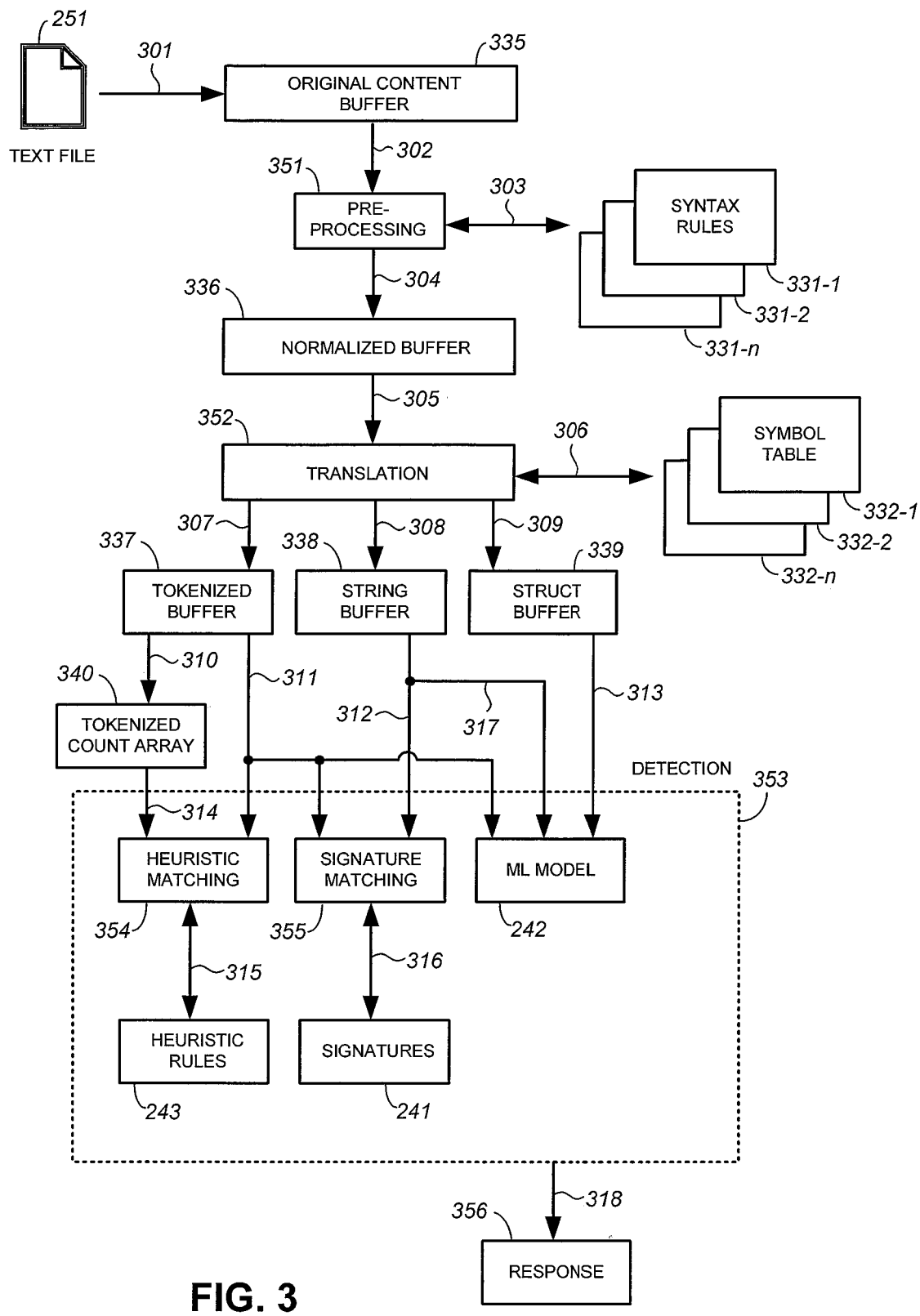
FIG. 3 shows a flow diagram of a method of detecting malicious scripts in accordance with an embodiment of the present invention.

FIG. 3 shows a flow diagram of a method of detecting malicious scripts in accordance with an embodiment of the present invention. The method of FIG. 3 is explained as performed by the endpoint system 230 configured with the malicious script detector 231.

In the example of FIG. 3, the text file 251 is received in the endpoint system 230 (see arrow 301). A text file being evaluated for malicious script is also referred to herein as a "target file." The original content of the text file 251 is stored in an original content buffer 335. In a preprocessing stage 351, the original content of the text file 251 is parsed (see arrow 302) for comparison against a plurality of syntax rules 331 (i.e., 331-1, 331-2, . . . , 331-n). Each of the syntax rules 331 may correspond to a particular scripting language, and includes rules for identifying that particular scripting language. For example, a syntax rule 331-1 may comprise rules for identifying a script written in the JavaScript scripting language, a syntax rule 331-2 may comprise rules for identifying a script written in the Visual Basic scripting language, and so on.

As is well-known, a token is the basic element of a source code. In the example of FIG. 3, a syntax rule 331 may include keywords, reserved words, operators, and other tokens that are used by a scripting language, and syntax rules that indicate how the tokens are arranged relative to one another in the scripting language. A source code containing tokens of a scripting language, wherein the tokens are arranged according to the syntax of the scripting language, may be deemed to be a script of that scripting language.

The preprocessing stage 351 may include sequencing through the original content (e.g., using a state machine) to find tokens of a scripting language that are arranged in accordance with the syntax of the scripting language as indicated in a corresponding syntax rule 331. Original content that is consistent with the syntax rules 331 of a scripting language is deemed to be a script of that scripting language. Original content that is not consistent with any of the syntax rules 331 is not a script.

In one embodiment, in the preprocessing stage 351, a normalization step is performed in parallel with the step of determining whether or not the text file 251 comprises a script. More particularly, while sequencing through the original content to find tokens of a scripting language, predetermined extraneous characters are removed from the original content. The remaining characters after the extraneous characters are removed from the original content are referred to herein as "normalized content", which is stored in a normalized buffer 336 (see arrow 304).

FIGS. 4A-4E show example buffer contents in accordance with an embodiment of the present invention. Beginning with FIG. 4A, there is shown an example original content stored in the original content buffer 335. The original content of FIG. 4A is a script written in the JavaScript scripting language. As the endpoint system 230 sequences through the original content of FIG. 4A, i.e., going through "I", "k", space, "T", . . . etc., to determine if the original content is a script, the endpoint system 230 may, in parallel, build the content of the normalized buffer 336 by removing predetermined extraneous characters from the original content. In one embodiment, the predetermined extraneous characters are duplicate spaces (i.e., if there are two or more spaces, only one space is retained), tab, white spaces, return, and characters that are part of a comment. Spaces and tab may be normalized to a one space character.

FIG. 4B shows the resulting normalized content in the normalized buffer 336 after the original content of FIG. 4A has been normalized. In the example of FIG. 4B, the characters of the comment (i.e., "r Test for eval( )*/") and the return at end of the first semicolon have been removed from the original content, and spaces and tab are normalized to a one space character. The normalized content facilitates generation of the contents of the tokenized buffer 337, string buffer 338, and structure buffer 339.

Continuing the example of FIG. 3, a translation stage 352 follows the preprocessing stage 351 (see arrow 305). The translation stage 352 may involve further separating and storing portions of the normalized content into a plurality of buffers. The translation stage 352 includes translating the tokens of the normalized content to corresponding symbols in accordance with a corresponding symbol table 332 (i.e., 332-1, 332-2, . . . , 332-n) (see arrow 306), and storing the symbols in the tokenized buffer 337 (see arrow 307). Each of the symbol tables 332 is for a particular scripting language. For example, the symbol table 332-1 may provide for translating tokens of JavaScript scripting language into symbols, the symbol table 332-2 may provide for translating tokens of Visual Basic scripting language into symbols, etc.

Figure 5:
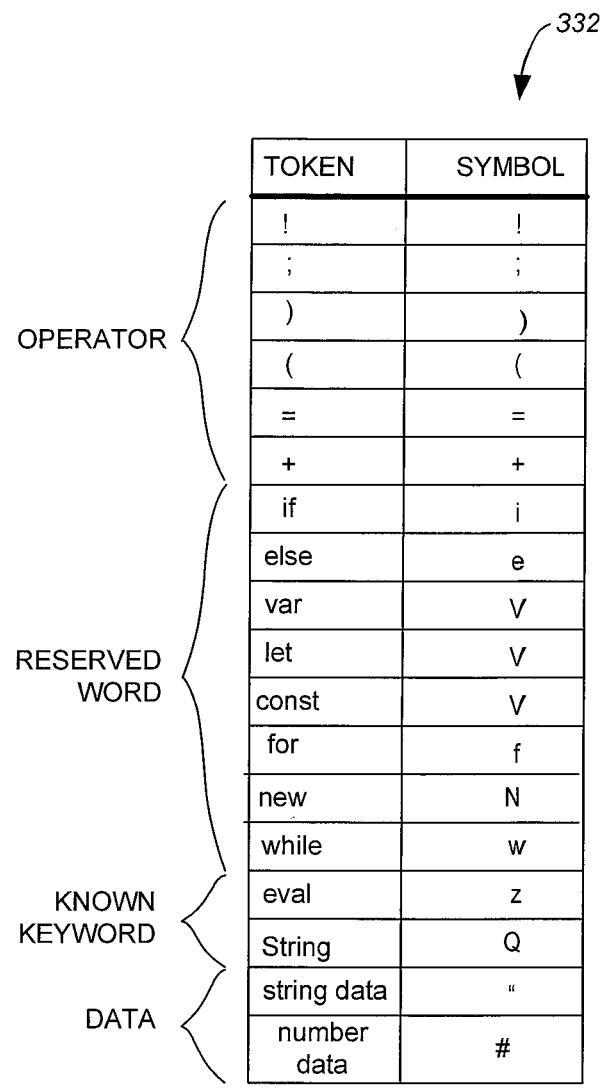
FIG. 5 shows a symbol table in accordance with an embodiment of the present invention.

FIG. 5 shows an example symbol table 332 in accordance with an embodiment of the present invention. In the example of FIG. 5, the symbol table 332 is for the JavaScript scripting language. For clarity of illustration, the example of FIG. 5 does not show all of the tokens that have corresponding symbols. In the example of FIG. 5, the tokens include operators, reserved words, known keywords, and parameter data of another token (e.g., string data of the known keyword "String"). In the example of FIG. 5, a token indicated in the TOKEN column is translated to a symbol indicated in the SYMBOL column. For example, the reserved word "if" is translated to the symbol "i", the operator "!" is translated to the symbol "!" (no change), the known keyword "String" is translated to the symbol "Q", and the string data of the known keyword "String" is translated to the symbol open quote (i.e.,").

Note that some tokens may share the same symbol. For example, the reserved words "var", "let", and "const" are all translated to the symbol "V". In one embodiment, a token that is not indicated in a corresponding symbol table 332 is replaced with the symbol underscore (i.e., "_"). More particularly, all tokens that do not have corresponding symbols in the symbol table 332 may be replaced with a common symbol, which is an underscore in one embodiment.

As a particular example, using the symbol table 332 of FIG. 5, the normalized content of FIG. 4B may be translated to the tokenized content of FIG. 4C. More particularly, referring to FIGS. 4B and 4C, the token "var" in the normalized buffer 336 is translated to the symbol "V" and stored in the tokenized buffer 337, the token "expr" is not recognized in the symbol table 332 and is thus translated to underscore and stored in the tokenized buffer 337, the token "=" in the normalized buffer 336 is translated to the symbol "=" and stored in the tokenized buffer 337, and so on. The resulting tokenized content in the tokenized buffer 337 comprises symbols that facilitate comparison of the tokens to tokens included in the heuristic rules 243 and the signatures 241, and that facilitate correspondence to tokens used to train the machine learning model 242.

Continuing the example of FIG. 3, the translation stage 352 includes extracting strings from the normalized buffer 336 and storing the extracted strings in the string buffer 338 (see arrow 308). In one embodiment, the resulting string content only includes strings, string variables, and string data used as parameter; operators, known keywords, and reserved words are not included in the string buffer 338.

As a particular example, using the symbol table 332 of FIG. 5, strings may be extracted from the normalized buffer 336 of FIG. 4B and stored in the string buffer 338 of FIG. 4D. More particularly, referring to FIGS. 4B and 4D, the string variable "expr" in the normalized buffer 336 is extracted and stored in the string buffer 338, the string parameter data "2+2" in the normalized buffer 336 is extracted and stored in the string buffer 338, and the string parameter data "expr" in the normalized buffer 336 is extracted and stored in the string buffer 338. In one embodiment, the strings in the string buffer 338 are concatenated as a single continuous string, with a string being kept when part of a word (e.g., between a two-word string) or phrase.

Continuing the example of FIG. 3, the translation stage 352 further includes extracting tokens that represent the syntactical structure of the normalized content (and thus the script) and storing the extracted tokens in the structure buffer 339 (see arrow 309). The resulting structure content in the structure buffer 339 represents the basic structure of a script without parameters, comments, and strings, which may induce noise in the machine learning model 242. In one embodiment, the structure content is concatenated in the structure buffer 339 as a single continuous string.

More particularly, referring to FIGS. 4B and 4E, the reserved word "var" in the normalized buffer 336 is extracted and stored in the structure buffer 339, the operator "=" in the normalized buffer 336 is extracted and stored in the structure buffer 339, the reserved word "new" in the normalized buffer 336 is extracted and stored in the structure buffer 339, the known keyword "String "is extracted (without its string parameter data) and stored in the structure buffer 339, the operator "("in the normalized buffer 336 is extracted and stored in the structure buffer 339, and so on.

In the example of FIG. 3, after the translation stage 352, the tokenized buffer 337, the string buffer 338, and the structure buffer 339 are filled with their respective tokenized content, string content, and structure content.

The contents of the tokenized count array 340 may be generated during generation of the contents of the tokenized buffer 337 (see arrow 310). In one embodiment, the tokenized count array 340 identifies tokens that are represented as symbols in the tokenized buffer, and a count of the number of the tokens in the normalized content. For example, assuming there are four instances of the known keyword "eval" (represented as the symbol "z" in the tokenized buffer 337) in the normalized content, the tokenized count array 340 would include an entry for "eval" with a count of four.

FIGS. 6A-6F show another example buffer contents in accordance with an embodiment of the present invention. FIG. 6A shows an original content of a script as stored in the original content buffer 335, and FIG. 6B shows the corresponding normalized content stored in the normalized buffer 336. In the example of FIG. 6B, the normalized content has not been concatenated as a single continuous string on one line for ease of illustration. FIG. 6C shows the tokenized content in the tokenized buffer 337 resulting from the translation of the normalized content into symbols using a corresponding symbol table (not shown).

FIG. 6D shows the tokenized count array 340 for the tokens represented in the tokenized buffer 337 and the counts of the tokens. In the example of FIG. 6D, the token "#String" appear 4 times in the normalized content, the token "#Number" appear 2 times in the normalized content, the token "(" appear 5 times in the normalized content, and so on.

FIG. 6E shows the string extracted from the normalized content and stored in the string buffer 338. FIG. 6F shows the structure content stored in the structure buffer 339, representing the syntactical structure of the normalized content.

The contents of the tokenized buffer 337, the string buffer 338, and the structure buffer 339 facilitate and speed up detection of malicious scripts. Referring back to the example of FIG. 3, the contents of the tokenized count array 340 (see arrow 314) and the tokenized buffer 337 (see arrow 311) may be compared against the heuristic rules 243 (see arrow 315) in a heuristic matching 354 step during the detection stage 353.

Generally speaking, the preprocessing stage 351 and the translation stage 352 previously discussed may be applied on known malicious scripts to generate tokenized contents, string contents, and structure contents of known malicious scripts that may be compared to those of a target file being evaluated. More particularly, known malicious scripts may be processed in accordance with the preprocessing stage 351 and the translation stage 352 to identify tokenized content, token counts, and string content that may be used to generate heuristic rules and signatures for identifying malicious scripts.

The heuristic rules 243 may indicate the token combinations and token counts that are indicative of malicious scripts. Using the tokenized content of FIG. 6C and corresponding tokenized count array of FIG. 6D as an example, the heuristic rules 243 may indicate that "CreateObject", which is translated to the symbol "*" (i.e., unicode hex character x87) in the example of FIG. 6C, in a predetermined proximity with other tokens (not shown) and in conjunction with having two counts of "Wscript" and other token counts (not shown) are indicative of malicious scripts. The token combinations and token counts indicative of malicious scripts may be determined by antivirus researchers from known malicious scripts collected in the wild.

The detection stage 353 may further include a signature matching 355 step, whereby the content of the tokenized buffer 337 (see arrow 311) and the content of the string buffer 338 (see arrow 312) are compared against the signatures 241 (see arrow 316) of known malicious scripts. The signatures 241 may be in terms of the same symbols that are used during the translation stage 352 to generate the tokenized content. This facilitates comparison of the tokenized content of the text file 251 being evaluated to the signatures 241 of known malicious scripts.

Referring to the tokenized content of FIG. 6C as an example, the signatures 241 may have a signature 241-1 that is present in known malicious scripts, thus indicating that the text file 251 from which the tokenized content of FIG. 6C was generated is also malicious. It is to be noted that the underscore symbol may indicate tokens that are not included in the symbol table used to generate the tokenized content. This means that a malicious script will be detected regardless of the original characters replaced by the underscore symbol, thereby facilitating detection of obfuscated scripts.

During the signature matching 355 step, the content of the string buffer 338 may be matched against strings indicative of malicious scripts. For example, the string "HTTP://EDICEP.ES/ERT/SS.EXE" may be known to point to a malicious website, and thus has a signature 241-2 included in the signatures 241. Because the string buffer 338 of FIG. 6E has a string matching the signature 241-2, the text file 251 being evaluated may be deemed to be malicious.

A machine learning model 242 may be trained using features that are present in known malicious scripts. The features of known malicious scripts may be represented in terms of symbols, strings, and structure as in the translation stage 352, and employed to train the machine learning model 242 to detect malicious scripts. The machine learning model 242 may be trained using a suitable machine learning algorithm, such as the XGBOOST algorithm, without detracting from the merits of the present invention.

During the detection stage 353, the contents of the tokenized buffer 337 (see arrow 311), the string buffer 338 (see arrow 317), and the structure buffer 339 (see arrow 313) are input to the machine learning model 242 to make a prediction (classification) as to whether or not the text file 251 is malicious.

In a response stage 356, the endpoint system 230 performs one or more response actions in response to the text file 251 being detected as malicious script in the detection stage 353 (see arrow 318). The response actions may include putting the text file 251 in quarantine, deleting the text file 251, alerting an administrator, and/or performing other response action to block execution of the malicious script.

As can be appreciated from the foregoing, the steps of heuristic matching 354, signature matching 355, and prediction by the machine learning model 242 may be performed in parallel. Advantageously, because relevant portions of the original content of the target file, i.e., text file 251, have been parceled out into separate buffers, each of the buffers would have less content compared to the original content. The contents of the buffers are also tailored for the particular detection step. The steps of heuristic matching 354, signature matching 355, and prediction by the machine learning model 242 can thus be performed more efficiently and accurately, compared to evaluating the original content as a whole. The endpoint system 230 can thus perform malicious script detection faster and with less computing resources.

Figure 7:
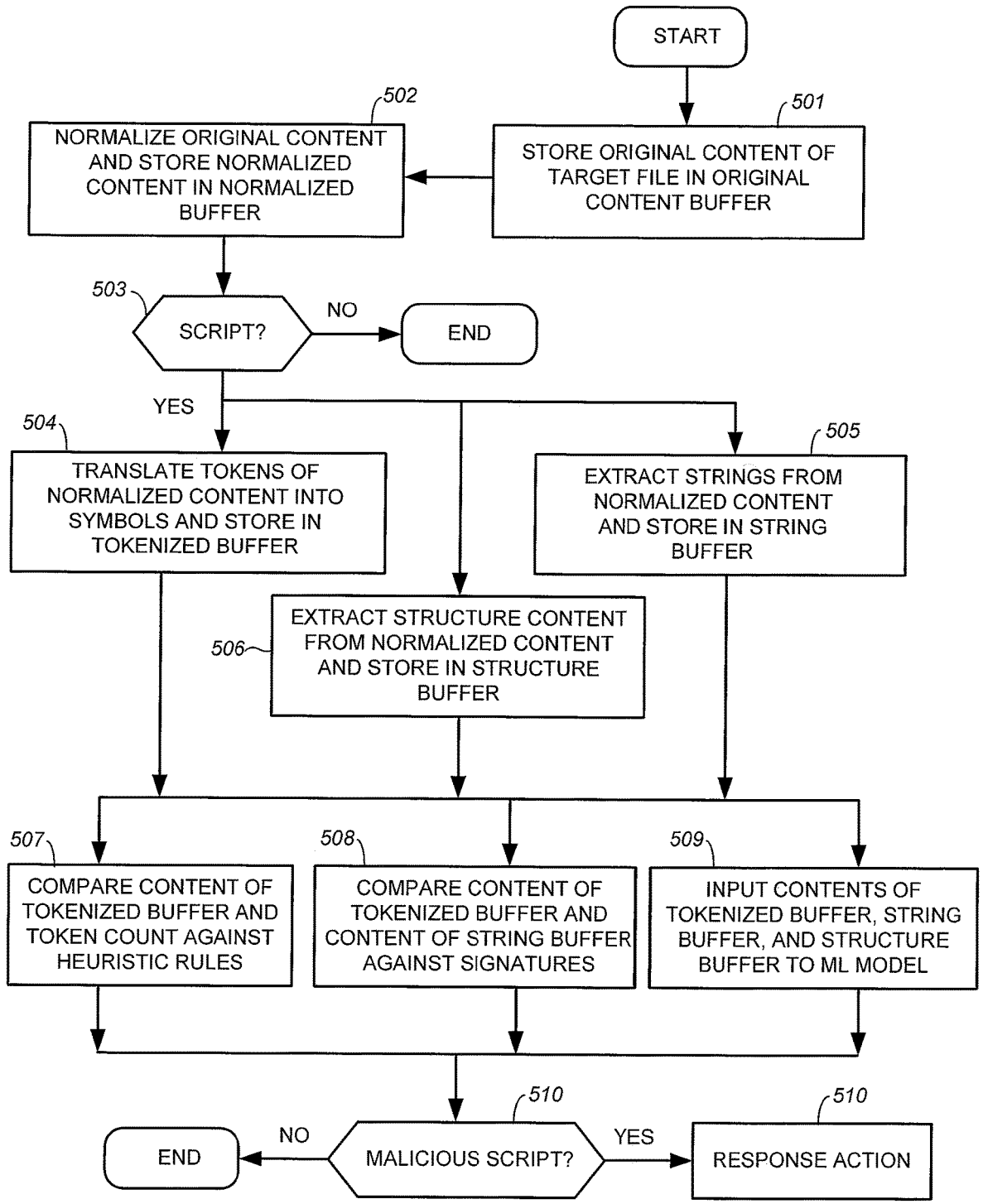
FIG. 7 shows a flow diagram of a method of detecting malicious scripts in accordance with an embodiment of the present invention.

FIG. 7 shows a flow diagram of a method of detecting malicious scripts in accordance with an embodiment of the present invention. The method of FIG. 7 may be performed by the endpoint system 230 as configured with the malicious script detector 231.

In the example of FIG. 7, a target file is received in the endpoint system 230. The endpoint system 230 starts evaluation of the target file for malicious script by storing the original content of the target file in the original content buffer 335 (step 501). The original content is normalized, and the normalized content is stored in the normalized buffer 336 (step 502). If the target file has original content indicative of a script (step 503, YES path), the tokens in the normalized buffer 336 are translated into corresponding symbols that are stored in the tokenized buffer 337 (step 504), strings are extracted from the normalized buffer 336 and stored in the string buffer 338 (step 505), and tokens indicative of the syntactical structure of the normalized content are extracted from the normalized buffer 336 and stored in the structure buffer 339 (step 506).

The endpoint system 230 continues evaluation of the target file by comparing the content of the tokenized buffer 337 and the count of tokens represented by symbols in the tokenized buffer 337 against heuristic rules 243 indicative of malicious scripts (step 507), comparing the content of the tokenized buffer 337 and the content of the string buffer 338 against signatures 241 of malicious scripts (step 508), and inputting the contents of the tokenized buffer 337, the string buffer 338, and the structure buffer 339 to the machine learning model 242 that has been trained to detect malicious scripts (step 509). If any of the comparison against the heuristic rules 243, comparison against the signatures 241, or prediction performed by the machine learning model 242 indicates that the target file comprises malicious script (step 510, YES path), the endpoint system 230 performs a response action (step 510) to prevent the malicious script from being executed.

Systems and methods for detecting malicious scripts have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a text file over a computer network;
storing an original content of the text file in an original content buffer;
detecting that the text file comprises source code of a script;
removing predetermined extraneous characters from the original content to generate a normalized content and storing the normalized content in a normalized buffer, the normalized content stored in the normalized buffer including tokens and strings of the original content;
translating tokens stored in the normalized buffer into symbols and storing the symbols in a tokenized buffer, wherein the tokenized buffer stores the symbols but not the strings stored in the normalized buffer;
extracting the strings stored in the normalized buffer and storing the extracted strings in a string buffer;
in parallel operations, comparing a content of the tokenized buffer and a content of the string buffer against corresponding signatures of malicious scripts;
generating a structure content by extracting, from the normalized buffer, tokens indicative of a syntactical structure of the normalized content;
storing the structure content in a structure buffer; and
inputting a content of the structure buffer, the content of the tokenized buffer, and the content of the string buffer to a machine learning model that has been trained to detect malicious scripts; and
performing a response action against the text file in response to detecting that the text file comprises a malicious script,
wherein the original content buffer, the normalized buffer, the tokenized buffer, the string buffer, and the structure buffer are separate buffers; and
wherein the comparison of the content of the tokenized buffer and the content of the string buffer against corresponding signatures of malicious scripts and the inputting of the content of the structure buffer, the content of the tokenized buffer, and the content of the string buffer to the machine learning model are performed in parallel.

2. The computer-implemented method of claim 1, further comprising:
generating counts of tokens stored as symbols in the tokenized buffer; and
comparing the content of the tokenized buffer and the counts of the tokens stored as symbols in the tokenized buffer against heuristic rules that are indicative of malicious scripts,
wherein the comparison of the content of the tokenized buffer and the counts of the token stored as symbols in the tokenized buffer against the heuristic rules is performed in parallel with the comparison of the content of the tokenized buffer and the content of the string buffer to corresponding signatures of malicious scripts.

3. The computer-implemented method of claim 1, wherein detecting that the text file comprises the source code of the script comprises parsing the original content stored in the original content buffer for syntax indicative of a particular scripting language, and
wherein the parsing of the original content stored in the original content buffer is performed in parallel with removing the predetermined extraneous characters from the original content to generate the normalized content.

4. The computer-implemented method of claim 1, wherein translating the tokens stored in the normalized buffer into symbols comprises:
translating a first token to a corresponding symbol in accordance with a symbol table; and
translating all tokens that do not have a corresponding symbol in the symbol table to a common predetermined symbol.

5. The computer-implemented method of claim 1, wherein the extracted strings are concatenated in the string buffer.

6. The computer-implemented method of claim 1, wherein the predetermined extraneous characters include characters of a comment.

7. The computer-implemented method of claim 1, wherein the response action blocks the malicious script from executing.

8. A computer system for detecting malicious scripts, the computer system comprising a processor and a memory, the memory storing instructions that when executed by the processor cause the computer system to:
receive a text file over a computer network;
store an original content of the text file in an original content buffer;
detect that the text file comprises source code of a script;
remove predetermined extraneous characters from the original content to generate a normalized content and store the normalized content in a normalized buffer, the normalized content stored in the normalized buffer including tokens and strings of the original content;
translate tokens stored in the normalized buffer into symbols and store the symbols in a tokenized buffer, wherein the tokenized buffer stores the symbols but not the strings stored in the normalized buffer;
extract the strings stored in the normalized buffer and store the extracted strings in a string buffer;

in parallel operations, compare a content of the tokenized buffer and a content of the string buffer against corresponding signatures of malicious scripts;
generate a structure content by extracting, from the normalized buffer, tokens indicative of a syntactical structure of the normalized content;
store the structure content in a structure buffer;
input a content of the structure buffer, the content of the tokenized buffer, and the content of the string buffer to a machine learning model that has been trained to detect malicious scripts; and
perform a response action against the text file in response to detecting that the text file comprises a malicious script,
wherein the original content buffer, the normalized buffer, the tokenized buffer, the string buffer, and the structure buffer are separate buffers; and
wherein the comparison of the content of the tokenized buffer and the content of the string buffer against corresponding signatures of malicious scripts and the inputting of the content of the structure buffer, the content of the tokenized buffer, and the content of the string buffer to the machine learning model are performed in parallel.

9. The computer system of claim 8, wherein the instructions stored in the memory, when executed by the processor, further cause the computer system to:

generate counts of tokens stored as symbols in the tokenized buffer; and
compare the content of the tokenized buffer and the counts of the tokens stored as symbols in the tokenized buffer against heuristic rules that are indicative of malicious scripts,
wherein the comparison of the content of the tokenized buffer and the counts of the tokens stored as symbols in the tokenized buffer against the heuristic rules is performed in parallel with the comparison of the content of the tokenized buffer and the content of the string buffer against corresponding signatures of malicious scripts.

10. The computer system of claim 8, wherein the tokens stored in the normalized buffer are translated into symbols by translating the tokens to the symbols in accordance with a symbol table, and translating all tokens that do not have a corresponding symbol in the symbol table to a common predetermined symbol.

11. The computer system of claim 8, wherein the extracted strings are concatenated in the string buffer.

12. The computer system of claim 8, wherein the predetermined extraneous characters include characters of a comment.

13. The computer system of claim 8, wherein the computer system receives the signatures of malicious scripts from a backend system over the Internet.

* * * * *